US007365476B2

(12) United States Patent
Tuss

(10) Patent No.: US 7,365,476 B2
(45) Date of Patent: Apr. 29, 2008

(54) METHODS AND SYSTEMS FOR SUPPORTING ACOUSTICAL TRANSDUCERS

(75) Inventor: Joel R. Tuss, Seattle, WA (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 10/788,988

(22) Filed: Feb. 27, 2004

(65) Prior Publication Data

US 2005/0189847 A1    Sep. 1, 2005

(51) Int. Cl.
*H01L 41/08* (2006.01)
(52) U.S. Cl. .................................. 310/328; 310/334
(58) Field of Classification Search ............ 310/337, 310/334, 359, 322, 328; 340/815.4; 367/153; 381/369; 174/69; H01L 41/08; H04R 17/00
See application file for complete search history.

(56) References Cited

U.S. PATENT DOCUMENTS

| 6,420,975 B1 * | 7/2002 | DeLine et al. ........... 340/815.4 |
| 6,743,982 B2 * | 6/2004 | Biegelsen et al. ............ 174/69 |
| 7,106,876 B2 * | 9/2006 | Santiago ..................... 381/369 |

OTHER PUBLICATIONS

Bruel & Kjaer—STSF; http://www.bksv.com/1401.asp; [accessed Jan. 14, 2004] (7 pgs).
G.R.A.S. Sound & Vibration; http://www.gras.dk/print.asp?id=2; [accessed Jan. 14, 2004] (1 pg).
Prototron Circuits, Quality Printed Circuit Boards; http://www.prototron.com; [accessed Jan. 14, 2004] (1 pg).
Remtech Sodar Technical Description, DC02/012, date unknown (9 pgs).
About Sodar, Atmospheric Research & Technology, LLC; http//www.sodar.com/about_sodar.htm; [accessed Dec. 12, 2003] (11 pgs).

* cited by examiner

*Primary Examiner*—Darren Schuberg
*Assistant Examiner*—Karen Addison
(74) *Attorney, Agent, or Firm*—Perkins Coie LLP

(57) ABSTRACT

Apparatuses and methods related to transducer arrays are disclosed. In one embodiment, an acoustical system includes a substrate with a plurality of conductive paths. A plurality of acoustical transducers can be carried by the substrate and positioned to form an array having at least one dimension. The acoustical transducers can be configured to sense sound and to transmit input signals to the substrate. The substrate can be configured to receive the input signals and to transmit an output signal to an output device. In another embodiment, a plurality of substrates having a plurality of conductive paths can carry a plurality of acoustical transducers, and can be coupled together and recoupled to fit into different volumes.

32 Claims, 5 Drawing Sheets

METHODS AND SYSTEMS FOR SUPPORTING ACOUSTICAL TRANSDUCERS

TECHNICAL FIELD

Embodiments of the present invention relate to transducer arrays, for example, an array of acoustical transducers for measuring ambient noise in a vehicle interior.

BACKGROUND

Acoustical systems often require an array of transducers configured to take measurements and/or transmit sound at multiple locations. For example, noise measurement tests often require an array of microphones arranged to measure noise at various locations. Such systems are commonly used in various industries, including those involving automotive and aircraft manufacturing.

FIG. 1 is a partially schematic view of a microphone array used to measure noise in accordance with the prior art. A tube frame 2 supports multiple microphones 1, typically in a one-dimensional or two-dimensional rectilinear arrangement. Each microphone 1 is connected to a coaxial cable 3, which can be connected to an external device that records data. Often, an additional structure 4 is required to position and support the tube frame 2 during use.

A shortcoming of the prior art design is that the arrangement of the microphones and the tube frame is heavy, bulky, and difficult to configure for various applications. For example, the tube frame 2 must be sized to support the coaxial cables 3 connected to each microphone 1. Additionally, it is difficult or impossible to easily reconfigure the tube frame 2 and the microphones 1 into other arrangements to fit different or complex volumes of space or to sense sound at specific locations. Oftentimes, a specific tube frame 2 must be designed and built for each application. Also, because the tube frame 2 and the coaxial cable 3 are bulky, the arrangement intrudes on the environment in which it is placed and can accordingly influence the measurements it takes. For example, the tube frame 2 and the coaxial cable 3 can reflect sound waves, absorb sound waves, and/or vary the volume of space in which the sound measurements are being taken, thereby affecting the measured sound data.

SUMMARY

The present invention is directed generally toward transducer arrays and, particularly, to arrays of acoustical transducers for sensing sound. One aspect of the invention is directed toward an acoustical system that includes a substrate having a plurality of conductive paths. The substrate can be operatively coupleable to an output device and can carry a plurality of acoustical transducers positioned to form an array having at least one dimension. The acoustical transducers can be configured to sense sound and to transmit input signals to the substrate. The substrate can be configured to receive the input signals and to transmit at least one output signal to the output device.

Another aspect of the invention is directed toward an acoustical system having a first substrate with a plurality of conductive paths, the first substrate being operatively coupleable to an output device. At least one first acoustical transducer can be carried by the first substrate. The at least one first acoustical transducer can be configured to sense sound and to transmit a first input signal to the first substrate. The first substrate can be configured to receive the first input signal and to transmit a first output signal to the output device. The system can further include at least one second substrate having a plurality of conductive paths, the second substrate being operatively coupleable to the output device or another output device. At least one second acoustical transducer can be carried by the at least one second substrate. The at least one second acoustical transducer can be configured to sense sound and to transmit a second input signal to the at least one second substrate. The at least one second substrate can be configured to transmit a second output signal to the output device or the other output device, and the first and second substrates can be coupled together to position the first and second acoustical transducers in an array having at least one dimension. In a further aspect of the invention, the first and second substrates can be postionable relative to each other in a first configuration that conforms to a first volume of space and positionable relative to each other in a second configuration that conforms to a second volume of space different than the first volume of space.

In yet another aspect of the invention, an acoustical method includes sensing sound with acoustical transducers carried by a substrate, wherein the acoustical transducers are positioned to form an array having at least one dimension. The method can further include transmitting input signals from the acoustical transducers to the substrate, receiving the input signals at the substrate, and transmitting at least one output signal from the substrate to an output device.

In still another aspect of the invention, an acoustical method includes positioning a first substrate carrying at least one first acoustical transducer and a second substrate carrying at least one second acoustical transducer such that the first and second acoustical transducers form an array having at least one dimension. The method can further include sensing sound with the at least one first acoustical transducer, transmitting a first input signal from the at least one first acoustical transducer to the first substrate, receiving the first input signal at the first substrate, and transmitting at least one first output signal from the first substrate to an output device. The method still further includes sensing sound with the at least one second acoustical transducer, transmitting a second input signal from the at least one second acoustical transducer to the second substrate, receiving the second input signal at the second substrate, and transmitting at least one second output signal from the second substrate to the output device or another output device.

DETAILED DESCRIPTION

The present disclosure describes transducer arrays and, in particular, arrays of acoustical transducers for measuring sound. Several specific details of the invention are set forth in the following description and in FIGS. 2-8 to provide a thorough understanding of certain embodiments of the invention. One skilled in the art, however, will understand that the present invention may have additional embodiments, and that other embodiments of the invention may be practiced without several of the specific features described below.

Figure 2:
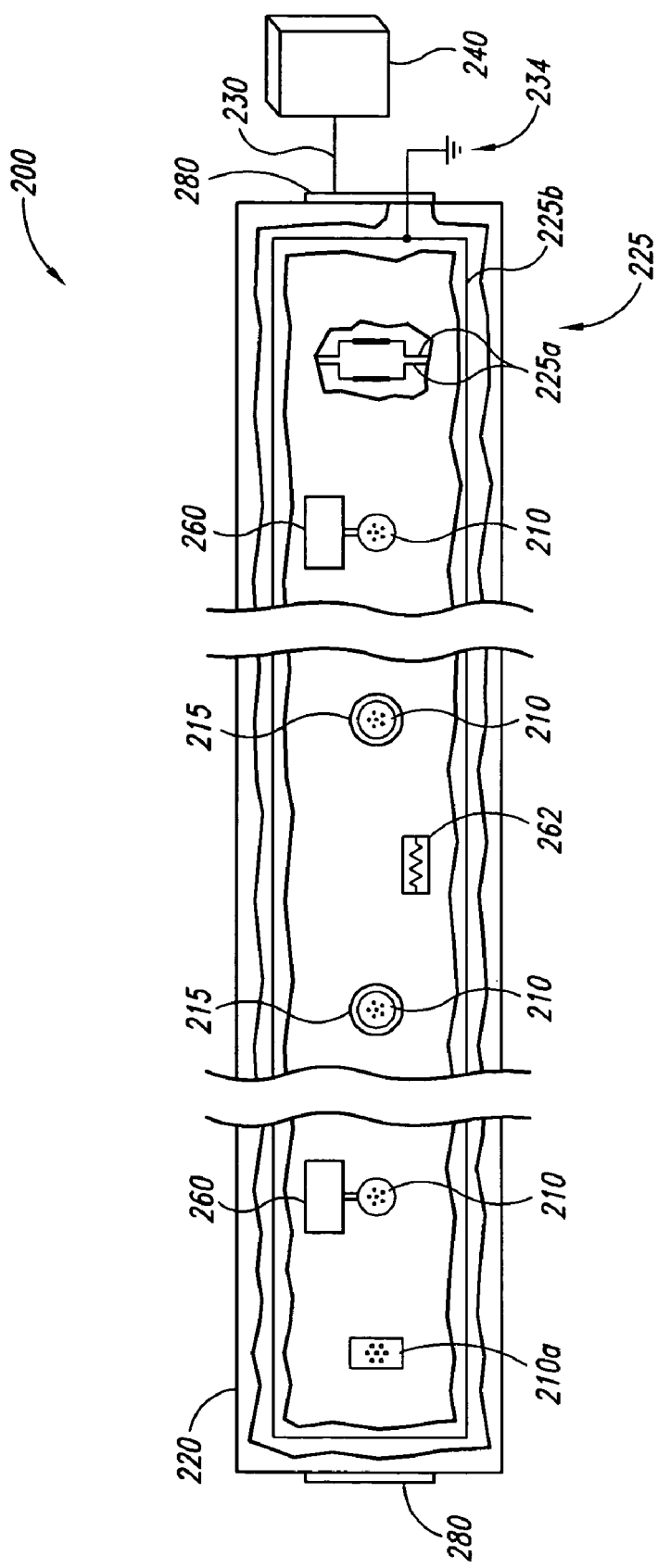
FIG. 2 is a partially schematic, partially broken illustration of a one-dimensional transducer array in accordance with an embodiment of the invention.

FIG. 2 is a partially schematic, partially broken illustration of an acoustical system 200 that includes a substrate 220 having a plurality of conductive paths 225 in accordance with one embodiment of the invention. The substrate 220 can carry a plurality of acoustical transducers 210 positioned to form an array having at least one dimension. The acoustical transducers 210 can be configured to sense sound and to transmit input signals to the substrate 220. The substrate 220 can be configured to receive the input signals and to transmit at least one output signal to an output device 240.

In a particular embodiment, the substrate 220 can include a rigid or semi-rigid structure having conductive paths on or within the structure. For example, the substrate 220 can include a circuit board made from rigid or semi-rigid composite material(s) and having integral conductive paths, circuits, and/or processing components (e.g., computer processing or signal processing components) fabricated into the material or composite.

The substrate 220 can include a plurality of conductive paths 225. FIG. 2 includes cut-away portions showing two first conductive paths 225a and one second conductive path 225b. The first conductive paths 225a are configured to carry the input signals from the acoustical transducers 210 and the output signals transmitted to the output device 240. Additionally, the first conductive paths 225a can carry a variety of other signals and/or electrical power for various components (including the acoustical transducers 210) coupled to the substrate 220.

In other embodiments, the configuration (e.g., size and location) of the conductive paths 225 can affect the electrical characteristics that the conductive paths 225 exhibit. For example, the size and location of first conductive paths 225a can be selected to provide the first conductive paths 225a with a selected impedance and/or capacitance. In a particular embodiment, the impedance, capacitance or other characteristic of the first conductive paths 225a can be selected to at least approximately match a corresponding electrical characteristic of a cable (e.g., a coaxial cable) or other device coupled to the substrate 220. This feature can be particularly useful when coupling multiple substrates 220 together, as discussed below in greater detail, or when coupling the substrate 220 to the output device 240.

The second conductive path 225b can be used for other purposes, for example, to provide shielding for the first conductive paths 225a. In FIG. 2, a second conductive path 225b is shown proximate to the first conductive paths 225a (e.g., around the periphery of the substrate 220) to at least partially surround or enclose the first conductive paths 225a, the acoustical transducers 210, and/or other components carried by the substrate 220. The second conductive path 225b can be coupled to ground 234 by any suitable method to shield these elements from electromagnetic interference, e.g., radio frequency interference. Suitable methods for coupling the second conductive path 225b to ground 234 can include cables, other substrates, and/or other devices (e.g., the output device 240). The second conductive path 225b can be used for purposes other than shielding in other embodiments and in still further embodiments, the shielding function can be provided by structures other than the second conductive path 225b.

The substrate 220 can be generally rigid in one embodiment, and/or flexible enough to bend into various shapes. For example, the substrate 220 can be rigid enough to support the acoustical transducers 210 and can provide electrical communication to and/or from the transducers 210 via the conductive paths 225. In certain embodiments, as discussed in further detail below, the substrate 220 can be generally self-supporting (e.g., capable of supporting the acoustical transducers 210 in a specified position without additional structure). In other embodiments, the substrate 220 can be coupled to a support or supported by other means (e.g., connected to a wall via screws or a cloth hook and loop type connector). The substrate 220 can be rectangular in shape (as shown in FIG. 2) or can have various other shapes and/or arrangements of acoustical transducers 210. Suitable substrates are available from Prototron Circuits of Redmond, Wash. and Tucson, Ariz.

The substrate 220 can carry a plurality of acoustical transducers 210 positioned to form a one-dimensional array. For example, the substrate 220 shown in FIG. 2 includes four acoustical transducers 210 arranged in a one-dimensional linear array. Other embodiments can have more or fewer acoustical transducers 210. The acoustical transducers 210 can be permanently coupled to the substrate 220 or coupled to the substrate via connectors (e.g., pin connectors). In FIG. 2, two acoustical transducers 210 are shown permanently coupled to the substrate 220, and two acoustical transducers 210 are shown coupled to the substrate 220 via corresponding connectors 215. Other embodiments can have more or fewer connectors 215 (including no connectors). Mounting the acoustical transducers 210 to connectors allows the number, type, and arrangement of transducers carried by the substrate 220 to be quickly altered to suit particular applications.

The acoustical transducers 210 can include microphones or any other type of transducer configured to sense sound (e.g., piezoelectric transducers). In certain embodiments, all of the acoustical transducers 210 are approximately identical in type. In other embodiments, the acoustical transducers 210 can be of different types. Suitable acoustical transducers 210 are available from G.R.A.S. Sound & Vibration of Denmark. The acoustical transducers 210 can also be selected to perform other functions (e.g., at least one of the first acoustical transducers 210 can be configured to both receive and transmit sound). Other embodiments can include other transducers configured to perform other functions. For example, FIG. 2 shows another transducer 210a carried by the substrate 220 and configured to only transmit sound.

In some embodiments, the substrate 220 can also include devices in addition to the transducers 210, for example, processing devices 260 and circuit devices 262. The processing devices 260 (two of which are shown in FIG. 2) can be integral with the substrate 220, connected to the substrate 220, removably coupled to the substrate 220, or operatively coupled to the substrate 220 by other methods (e.g., cable connection). The processing devices 260 can be operatively coupled to the acoustical transducers 210 to process the signals transmitted to and/or from the acoustical transducers. For example, if the acoustical transducers 210 transmit analog signals, the processing devices 260 can be used to convert the analog signals to digital signals. In other embodiments, the processing devices 260 can perform other signal processing functions or computational functions. For example, while in some embodiments, pairs of first conductive paths 225a can be dedicated to each acoustical transducer 210, in other embodiments, the first conductive paths 225a can form a data bus and the processing devices 260 can be used to interface the acoustical transducers 210 with the data bus by performing various functions, including time synchronization, frequency modulation, amplitude modulation, and/or signal conversion (e.g., converting an electrical signal into a fiber optic signal).

The circuit devices 262 can be selected to affect various electrical characteristics of the conductive paths 225 and/or the electrical power carried by the conductive paths 225. For example, the circuit devices 262 can include a capacitor and/or a resistor selected to at least approximately match the impedance of the first conductive paths 225a to that of a cable (e.g., a coaxial cable) or other device coupled to the substrate 220. Accordingly, power can be transferred efficiently between the conductive paths 225 and the cable or other device. The circuit device 262 can be integral to the substrate 220, connected to the substrate 220, removably coupled to the substrate 220, or operatively coupled to the substrate 220 by other methods (e.g., cable connection).

In FIG. 2, the substrate 220 transmits an output signal to the output device 240 via a substrate connector 280 and a cable 230. Two substrate connectors 280 are shown in FIG. 2 for the purpose of illustration. In other embodiments, the substrate 220 can have more or fewer substrate connectors 280 at a plurality of different locations. The substrate connectors 280 can be configured to connect the substrate 220 to other elements, including other substrates 220 and cables 230. In certain embodiments, the substrate 220 can be directly connected to the output device 240 or the cable 230 without the substrate connector 280. In still other embodiments, the substrate 220 can be operatively coupled to the output device 240 via other methods or connections, including via other device(s) and/or other substrates. In any of these embodiments, the output signal provided by the substrate 220 can be different than the input signal provided by the acoustical transducers 210 (as a result of the circuit devices 262 and/or the processing devices 260) or the output signal can be the same as the input signal (e.g., in the absence of circuit devices 262 and processors 260). The output device 240 can include a data recording device (e.g., a cassette recorder), a data processing device (e.g., laptop computer or other computer processor), or other processing device (e.g., a radio transmitter that transmits the data to another device for recording or processing).

Figure 3:
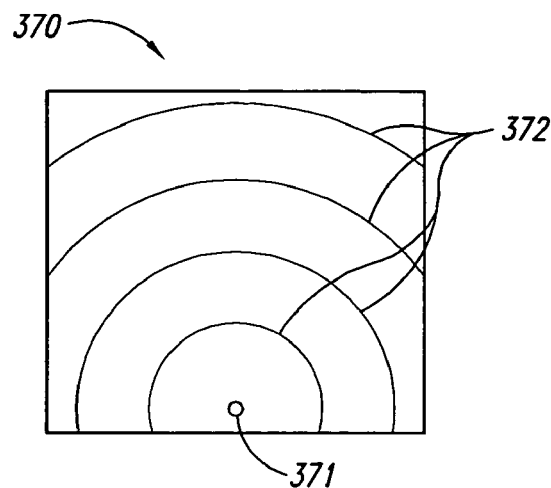
FIG. 3 illustrates a sound map produced using acoustical holographic techniques and a transducer array in accordance with an embodiment of the invention.

The output signal transmitted from the substrate 220 to the output device 240 can be suitable for use in various applications. For example, FIG. 3 shows a sound map 370 that graphically represents a sound source 371 along with sound waves 372 that can be produced using acoustical holographic techniques and sound measurements taken by an array of acoustical transducers in accordance with embodiments of the invention. More complex acoustical arrays can be used to produce sound maps having additional detail and complexity.

Figure 4:
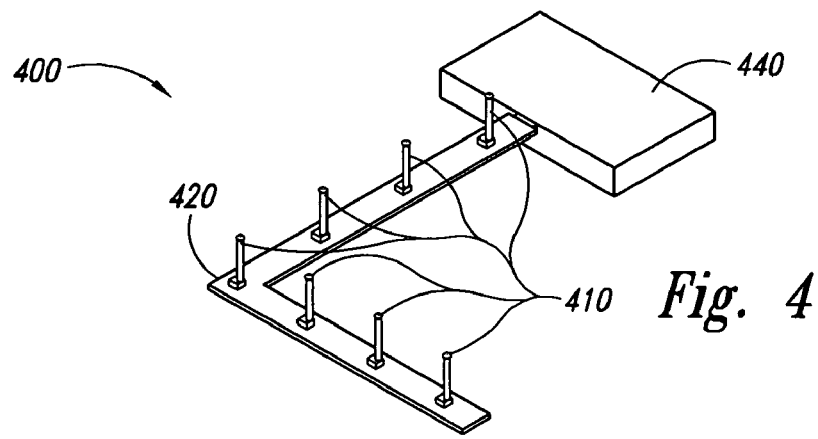
FIG. 4 is a partially schematic, isometric view of a two-dimensional array configured in accordance with an embodiment of the invention.

FIG. 4 is a partially schematic, isometric view of an acoustical system 400 that includes a single substrate 420 carrying a plurality of acoustical transducers 410 positioned to form a two-dimensional array, in accordance with another embodiment of the invention. As discussed above with reference to FIG. 2, the acoustical transducers 410 are configured to sense sound and to transmit an input signal to the substrate 420. The substrate 420 is configured to receive the input signals from the acoustical transducers 410 and to transmit an output signal to an output device 440. As shown in FIG. 4, the substrate 420 can be coupled directly to the output device 440.

Figure 5:
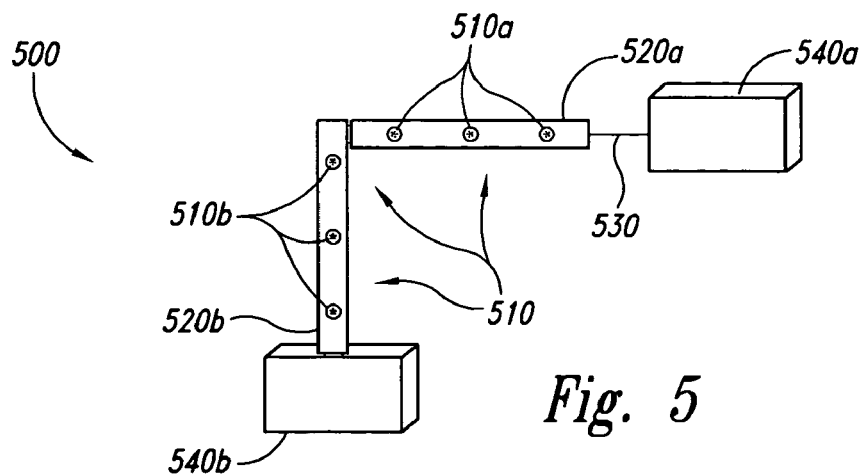
FIG. 5 is a partially schematic view of a two-dimensional array formed by a plurality of substrates in accordance with another embodiment of the invention.

FIG. 5 is a partially schematic view of an acoustical system 500 that includes a first substrate 520a coupled to a second substrate 520b, both of which carry a plurality of acoustical transducers 510 in a two-dimensional array, in accordance with yet another embodiment of the invention. The first substrate 520a can carry at least one first acoustical transducer 510a (three first acoustical transducers 510a are shown in FIG. 5). The first acoustical transducers 510a are configured to sense sound and to transmit a first input signal to the first substrate 520a. The first substrate 520a receives the first input signal and transmits at least one first output signal to a first output device 540a via a cable 530, which operatively couples the first substrate 520a to the first output device 540a.

The first substrate 520a is also coupled to the second substrate 520b. In one embodiment, the first and second substrates 520a, 520b are releasably coupled together. In another embodiment, the first and second substrates 520a, 520b are coupled together in a more permanent manner. At least one second acoustical transducer 510b is carried by the second substrate 520b (three second acoustical transducers 510b are shown in FIG. 5). The second acoustical transducers 510b are configured to sense sound and to transmit a second input signal to the second substrate 520b. The second substrate 520b can be configured to receive the second input signal and to transmit at least one second output signal to the first output device 540a via the first substrate 520a and the cable 530, or to a second output device 540b as shown in FIG. 5.

Even when the first substrate 520a transmits a first output signal to the first output device 540a and the second substrate 520b transmits a second output signal to the second output device 540b, the first and second substrates 520a, 520b can share information. For example, the first and second substrates 520a, 520b can transmit the first and second output signals, respectively, to both output devices 540a, 540b. This feature can provide redundancy in recording or processing data, or can be used for other purposes. For instance, in one embodiment, the first output device 540a can include a data recorder and the second output device 540b can include a computer for real-time data processing.

Figure 6A:
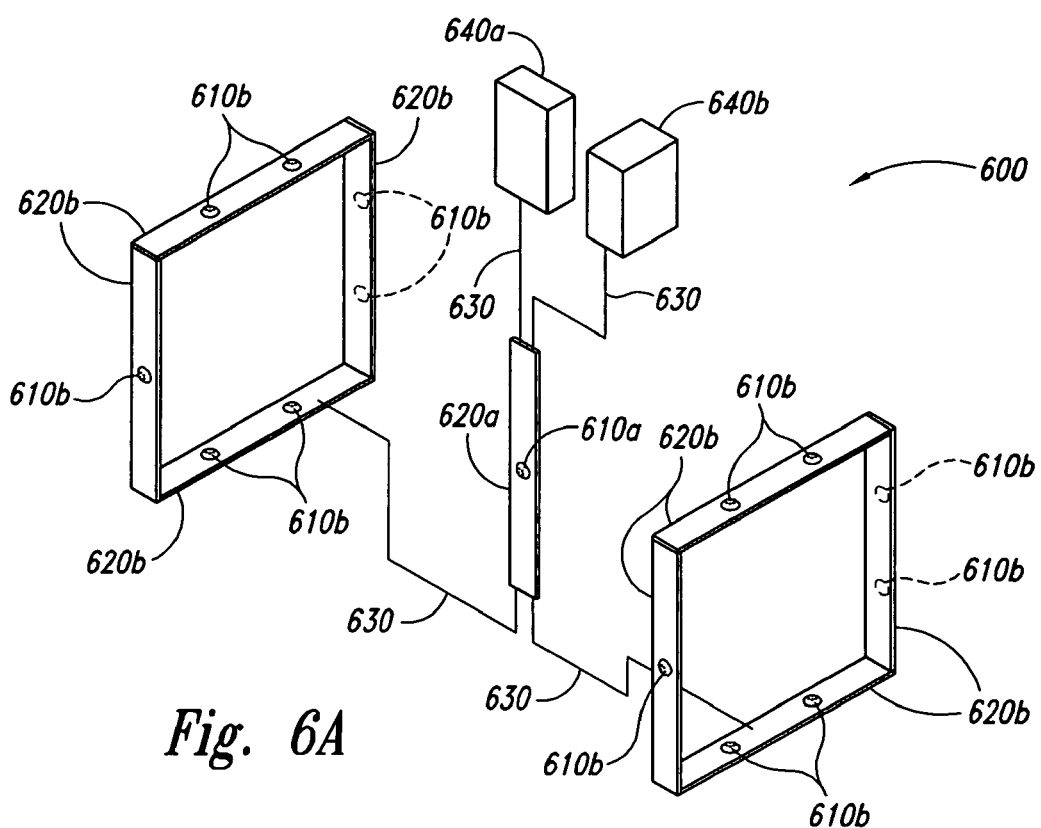
FIG. 6A is a partially schematic, isometric view of an acoustical system configured to form a three-dimensional array in accordance with an embodiment of the invention.

As illustrated in FIG. 5, multiple substrates carrying acoustical transducers can be coupled together to form arrays having more than one dimension. FIG. 6A is a partially isometric view of an acoustical system 600 having a first substrate 620a and a plurality of second substrates 620b carrying a plurality of acoustical transducers 610 and forming a three-dimensional array, in accordance with another embodiment of the invention. In FIG. 6A, at least one first acoustical transducer 610a is carried by the first substrate 620a, and at least one second acoustical transducer 610b is carried by at least one second substrate 620b. Eight second substrates 620b are shown in FIG. 6, each substrate carrying one or more second acoustical transducers 610b.

As discussed above with reference to FIG. 5, the first acoustical transducer 610a is configured to sense sound and to transmit a first input signal to the first substrate 620a and the second acoustical transducers 610b are configured to sense sound and to transmit second input signals to the respective second substrates 620b. The first substrate 620a is configured to transmit a first output signal to a first output device 640a. The at least one second substrate 620b is configured to transmit a second output signal to the first output device 640a or a second output device 640b. In an embodiment shown in FIG. 6A, a second output signal from each of the second substrates 620b is transmitted through a combination of other second substrates and/or cables 630 to the first substrate 620a. The first substrate 620a transmits the second output signal from the second substrates 620b, along with the first output signal, to the output device 640a and the other output device 640b through cables 630.

Figure 6B:
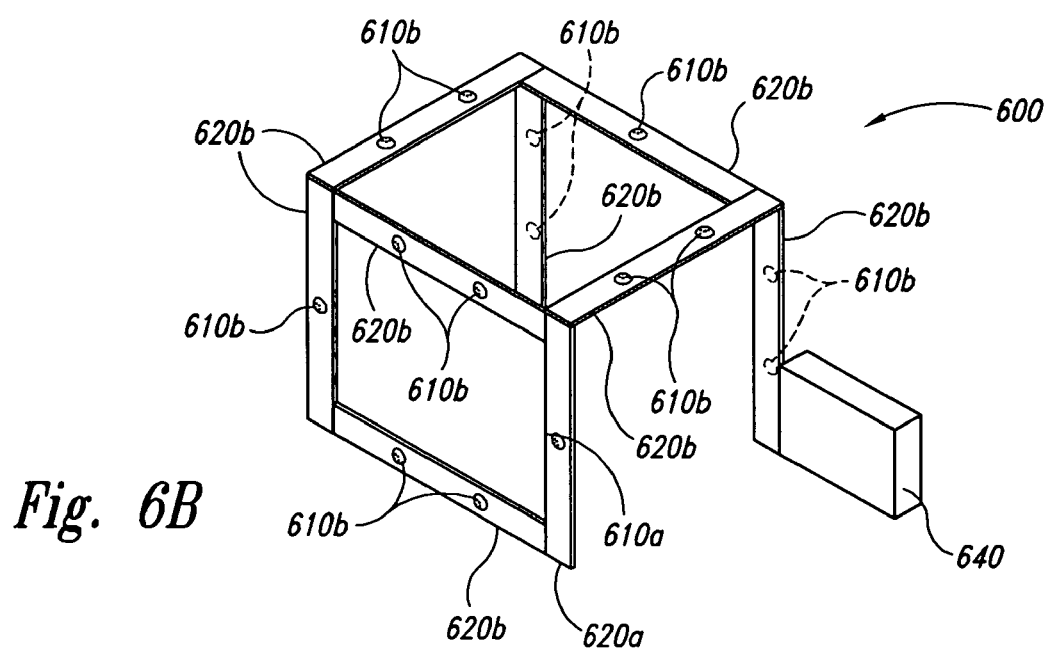
FIG. 6B is a partially schematic, isometric view of the acoustical system of FIG. 6A, reconfigured into a different array and further configured to be generally self-supporting, in accordance with another embodiment of the invention.

The first and second substrates 620a, 620b shown in FIG. 6A are configured to conform to a first volume of space and to position the first and second acoustical transducers 610a, 610b in an array having three dimensions. The first and second substrates 620a, 620b can be designed and made to be easily reconfigurable to conform to other volumes or to provide arrays having other dimensions (e.g., one dimension or two dimensions). For example, FIG. 6B shows the first and second substrates 620a, 620b of FIG. 6A reassembled to fit in a second volume of space and to be self-supporting.

The first and second substrates 620a, 620b can be configured to have a plurality of substrate connectors (e.g., as shown in FIG. 2) positioned at various locations to provide flexibility in reconfiguring the substrates into various arrangements. The connectors can be configured to couple the substrates to each other. Accordingly, the first and second substrates 620a, 620b shown in FIGS. 6A and 6B can be combined with other substrates to make larger arrays and/or only a few of the first and second substrates 620a, 620b can be used to form smaller arrays. In certain embodiments, one or more of the second substrates 620b can have no acoustical transducers 610b to serve as a connective element.

Figure 7:
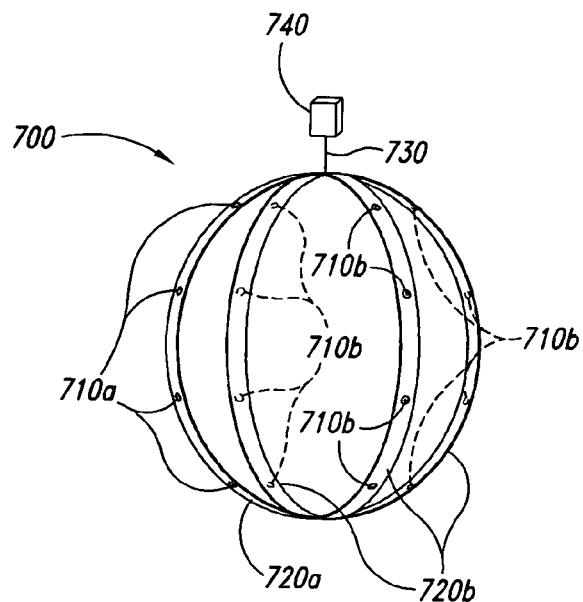
FIG. 7 is a partially isometric view of an acoustical system configured as a spherical array in accordance with an embodiment of the invention.

The substrates described above can be combined to fit virtually any volume of space and/or provide any shape of array. For example, FIG. 7 shows an acoustical system 700 that includes first and second substrates 720a, 720b positioned to provide a spherical array of first and second acoustical transducers 710a, 710b. The first and second acoustical transducers 710a, 710b provide first and second input signals to the first and second substrates 720a, 720b. The first and second substrates 720a, 720b receive the first and second input signals and transmit first and second output signals to an output device 740 via a cable 730.

In one embodiment, the first and second substrates 720a, 720b can include preformed rigid substrates having the selected shape to form the spherical array. In another embodiment, the first and second substrates 720a, 720b can include flexible substrates that can be shaped or bent into position to form the spherical array. In yet another embodiment, a single substrate can be shaped to form a spherical array of acoustical transducers.

Figure 8:
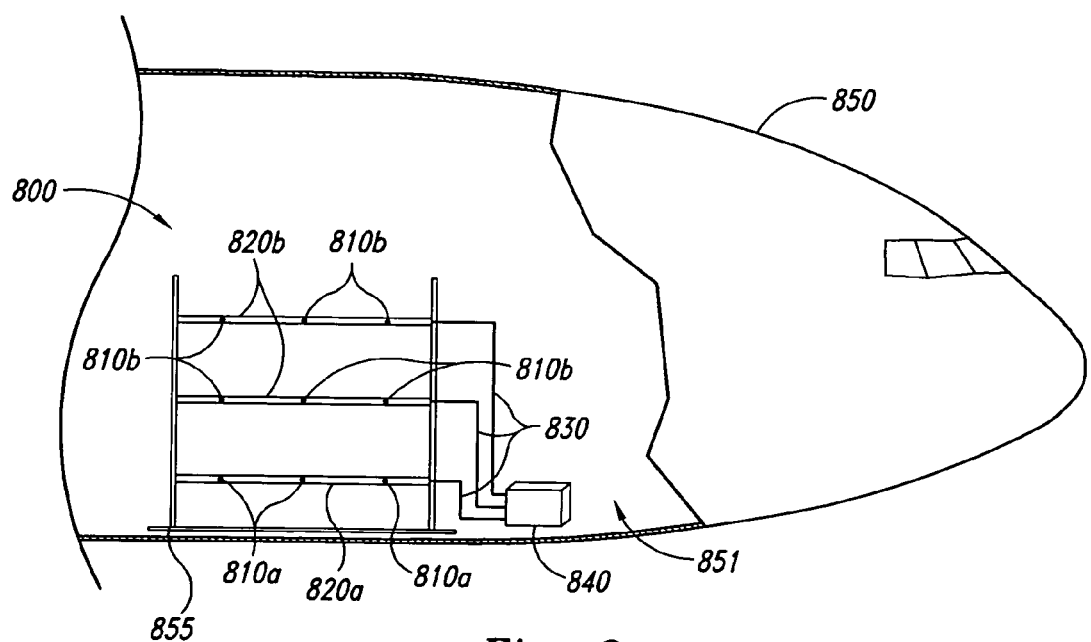
FIG. 8 is a partially schematic view of an acoustical system positioned in a vehicle interior in accordance with another embodiment of the invention.

An acoustical system 800 shown in FIG. 8 includes first and second substrates 820a, 820b coupled together via a support 855 and positioned in an interior 851 of a vehicle 850 to form a rectilinear array of first and second acoustical transducers 810a, 810b. The first and second acoustical transducers 810a, 810b provide first and second input signals to the first and second substrates 820a, 820b. The first and second substrates 820a, 820b receive the first and second input signals and transmit first and second output signals to an output device 840 via cables 830. As with any of the foregoing embodiments, the acoustical system 800 can be positioned to sense sound, for example, in an interior 851 of a vehicle 850 (e.g., an aircraft or automobile). The sensed sound can include noise produced by the operation of the vehicle 850 and/or noise from the surrounding environment.

One feature of embodiments of the acoustical systems described above is that they can be relatively small. One advantage of this feature is that the system can have little acoustical impact on the sound environment in which it is placed. For example, embodiments of the arrays described above can absorb, block, and/or reflect relatively few sound waves, resulting in improved performance (e.g., improved data quality during data collection).

Figure 1:
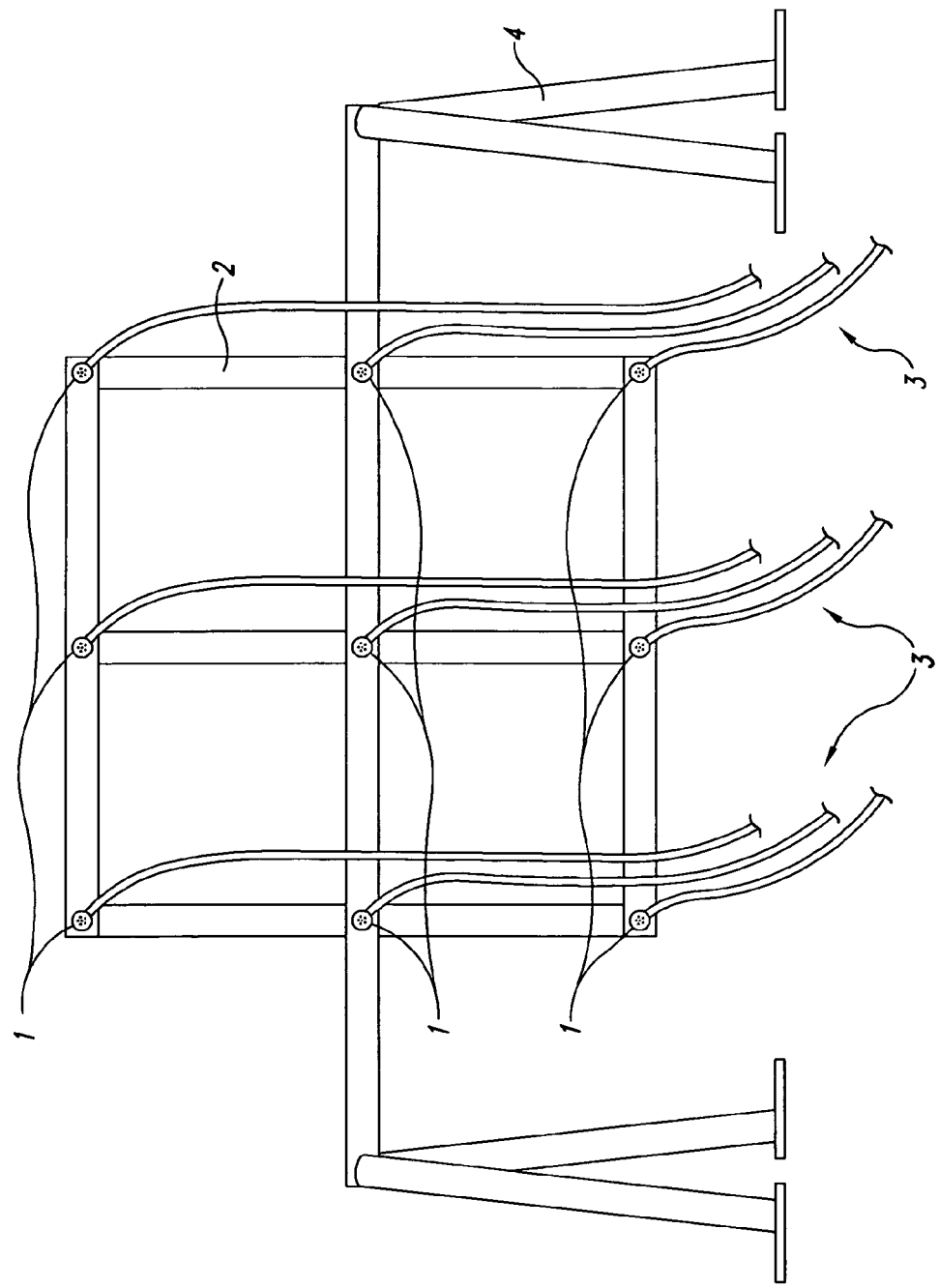
FIG. 1 is a partially schematic illustration of an arrangement of microphones supported by a tube frame in accordance with the prior art.

Another feature of embodiments of the acoustical systems described above is that they can be self-supporting. An advantage of this feature is that the supporting structure for conventional systems (as shown in FIG. 1), which can impact the sound environment, can be reduced or eliminated altogether. Additionally, the expense of constructing and setting up the supporting structure can be reduced or eliminated.

Yet another feature of embodiments of the acoustical systems described above is that they are lightweight and easily changeable. An advantage of this feature is that a single system can be made to conform to different applications. For example, the substrates can be reconfigured to fit various volumes of space having different shapes and sizes, thereby reducing the cost associated with creating a system for each application. Furthermore, the acoustical system can be easier and quicker to set up for use than the conventional array shown in FIG. 1, further reducing costs.

From the foregoing, it will be appreciated that specific embodiments of the invention have been described herein for purposes of illustration, but that various modifications may be made without deviating from the spirit and scope of the invention. Apparatuses and methods in accordance with further embodiments of the invention can include other combinations of the features described above. For example, at least some of the acoustical transducers can be configured to transmit sound as part of an active noise reduction system that senses noise and transmits noise canceling sound waves. Accordingly, the invention is not limited except by the following claims.

I claim:

1. An acoustical system, comprising:
   a vehicle having an interior;
   a substrate positioned in the interior of the vehicle and having a plurality of conductive paths, the substrate being operatively coupleable to an output device; and
   a plurality of acoustical transducers carried by the substrate in the interior of the vehicle and positioned to form an array having at least two dimensions, the acoustical transducers being configured to sense sound and to transmit input signals to the substrate, the substrate being configured to receive the input signals and to transmit at least one output signal to the output device.

2. The system of claim 1 wherein the substrate includes a circuit board.

3. The system of claim 1 wherein the acoustical transducers include microphones.

4. The system of claim 1 wherein the output device includes a recorder.

5. The system of claim 1 wherein the output device includes a computer processor.

6. The system of claim 1 wherein the substrate is configured to transmit an output signal that is at least approximately the same as at least one of the input signals.

7. The system of claim 1 wherein the substrate is generally self-supporting.

8. The system of claim 1 wherein the plurality of acoustical transducers includes at least one acoustical transducer configured to sense sound and at least one acoustical transducer configured to transmit sound.

9. The system of claim 1 wherein at least one of the plurality of acoustical transducers carried by the substrate is further configured to transmit sound.

10. The system of claim 1 wherein the substrate includes a connector coupled to at least one of the conductive paths and wherein at least one of the acoustical transducers is coupled to the connector.

11. The system of claim 1 wherein the substrate includes a first substrate, and wherein the system further comprises at least one second substrate, with the first substrate being operatively coupleable to the output device via the at least one second substrate.

12. The system of claim 1 wherein the substrate is operatively coupleable to the output device via at least one cable.

13. The system of claim 1 wherein the substrate further includes a processing device coupled to at least one of the conductive paths and at least one of the acoustical transducers to process an input signal from the at least one acoustical transducer.

14. The system of claim 1 wherein the substrate further includes a processing device coupled to at least one of the conductive paths and at least one of the acoustical transducers to digitize an input signal from the at least one acoustical transducer.

15. The system of claim 1 wherein the substrate includes at least one of a resistor and a capacitor.

16. The system of claim 1 wherein the plurality of conductive paths includes at least one first conductive path and at least one second conductive path, the at least one first conductive path being configured to carry at least one of the input and output signals, and the at least one second conductive path being coupled to ground and located proximate to the at least one first conductive path to shield the first conductive path.

17. The system of claim 1 wherein the acoustical transducers are positioned to sense noise produced by at least one of the vehicle and an environment surrounding the vehicle.

18. An acoustical system, comprising:
a first substrate having a plurality of conductive paths, the first substrate being operatively coupleable to an output device;
at least one first acoustical transducer carried by the first substrate, the at least one first acoustical transducer being configured to sense sound and to transmit a first input signal to the first substrate, the first substrate being configured to receive the first input signal and to transmit a first output signal to the output device;
at least one second substrate having a plurality of conductive paths, the second substrate being operatively coupleable to the output device or another output device; and
at least one second acoustical transducer carried by the at least one second substrate, the at least one second acoustical transducer being configured to sense sound and to transmit a second input signal to the at least one second substrate, the at least one second substrate being configured to transmit a second output signal to the output device or the other output device, and the first and second substrates being coupled together to position the first and second acoustical transducers in an array having at least two dimensions.

19. The system of claim 18 wherein the first and second substrates are releasably coupled together.

20. The system of claim 18 wherein at least one of the first and second substrates is operatively coupleable to the output device via at least one cable.

21. An acoustical system, comprising:
a first substrate having a plurality of conductive paths, the first substrate being operatively coupleable to an output device;
at least one first acoustical transducer carried by the first substrate, the at least one first acoustical transducer being configured to sense sound and to transmit a first input signal to the first substrate, the first substrate being configured to receive the first input signal and to transmit a first output signal to the output device;
at least one second substrate having a plurality of conductive paths, the second substrate being operatively coupleable to the output device or another output device; and
at least one second acoustical transducer carried by the at least one second substrate, the at least one second acoustical transducer being configured to sense sound and to transmit a second input signal to the at least one second substrate, the at least one second substrate being configured to transmit a second output signal to the output device or the other output device, and the first and second substrates being coupled together to position the first and second acoustical transducers in a spherical array.

22. An acoustical system, comprising:
a first substrate having a plurality of conductive paths, the first substrate being operatively coupleable to an output device;
at least one first acoustical transducer carried by the first substrate, the at least one first acoustical transducer being configured to sense sound and to transmit a first input signal to the first substrate, the first substrate being configured to receive the first input signal and to transmit a first output signal to the output device;
at least one second substrate having a plurality of conductive paths, the second substrate being operatively coupleable to the output device or another output device; and
at least one second acoustical transducer carried by the at least one second substrate, the at least one second acoustical transducer being configured to sense sound and to transmit a second input signal to the at least one second substrate, the at least one second substrate being configured to transmit a second output signal to the output device or the other output device, and the first and second substrates being coupled together to position the first and second acoustical transducers in a two dimensional rectilinear array.

23. The system of claim 18 wherein the first and second substrates are positionable relative to each other in a first configuration that conforms to a first volume of space and positionable relative to each other in a second configuration that conforms to a second volume of space different than the first volume of space.

24. The system of claim 18, further comprising a vehicle having an interior, the first and second substrates and the first and second acoustical transducers being positioned in the interior.

25. An acoustical system, comprising:
a substrate having a plurality of conductive paths, the substrate being operatively coupleable to an output device; and
a plurality of acoustical transducers, including microphones, carried by the substrate and positioned to form an array having at least two dimensions, the acoustical transducers being configured to sense sound and to transmit input signals to the substrate, the substrate being configured to receive the input signals and to transmit at least one output signal to the output device.

26. An acoustical system, comprising:
a substrate having a plurality of conductive paths, the substrate being operatively coupleable to an output device that includes a recorder; and
a plurality of acoustical transducers carried by the substrate and positioned to form an array having at least two dimensions, the acoustical transducers being configured to sense sound and to transmit input signals to the substrate, the substrate being configured to receive the input signals and to transmit at least one output signal to the output device.

27. An acoustical system, comprising:
a substrate having a plurality of conductive paths, the substrate being operatively coupleable to an output device; and
a plurality of acoustical transducers carried by the substrate and positioned to form an array having at least two dimensions, the acoustical transducers being configured to sense sound and to transmit input signals to the substrate, wherein at least one acoustical transducer is configured to sense sound and at least one acoustical transducer is configured to transmit sound, the substrate being configured to receive the input signals and to transmit at least one output signal to the output device.

28. An acoustical system, comprising:
a substrate having a plurality of conductive paths, the substrate being operatively coupleable to an output device; and
a plurality of acoustical transducers carried by the substrate and positioned to form an array having at least two dimensions, the acoustical transducers being configured to sense sound and to transmit input signals to the substrate, wherein at least one of the acoustical transducers is further configured to transmit sound, the substrate being configured to receive the input signals and to transmit at least one output signal to the output device.

29. An acoustical system, comprising:
a substrate having a plurality of conductive paths, the substrate being operatively coupleable to an output device; and
a plurality of acoustical transducers carried by the substrate and positioned to form an array having at least two dimensions, the acoustical transducers being configured to sense sound and to transmit input signals to the substrate, the substrate being configured to receive the input signals and to transmit at least one output signal to the output device, wherein the substrate includes a first substrate, and wherein the system further comprises at least one second substrate, with the first substrate being operatively coupleable to the output device via the at least one second substrate.

30. An acoustical system, comprising:
a substrate having a plurality of conductive paths, the substrate being operatively coupleable to an output device; and
a plurality of acoustical transducers carried by the substrate and positioned to form an array having at least two dimensions, the acoustical transducers being configured to sense sound and to transmit input signals to the substrate, the substrate being configured to receive the input signals and to transmit at least one output signal to the output device, wherein the substrate further includes a processing device coupled to at least one of the conductive paths and at least one of the acoustical transducers to digitize an input signal from the at least one acoustical transducer.

31. An acoustical system, comprising:
a substrate having a plurality of conductive paths and including at least one of a resistor and a capacitor, the substrate being operatively coupleable to an output device; and
a plurality of acoustical transducers carried by the substrate and positioned to form an array having at least two dimensions, the acoustical transducers being configured to sense sound and to transmit input signals to the substrate, the substrate being configured to receive the input signals and to transmit at least one output signal to the output device.

32. An acoustical system, comprising:
a substrate having a plurality of conductive paths, the substrate being operatively coupleable to an output device; and
a plurality of acoustical transducers carried by the substrate and positioned to form an array having at least two dimensions, the acoustical transducers being configured to sense sound and to transmit input signals to the substrate, the substrate being configured to receive the input signals and to transmit at least one output signal to the output device, wherein the plurality of conductive paths includes at least one first conductive path and at least one second conductive path, the at least one first conductive path being configured to carry at least one of the input and output signals, and the at least one second conductive path being coupled to ground and located proximate to the at least one first conductive path to shield the first conductive path.

* * * * *

UNITED STATES PATENT AND TRADEMARK OFFICE
CERTIFICATE OF CORRECTION

PATENT NO.        : 7,365,476 B2  Page 1 of 1
APPLICATION NO.   : 10/788988
DATED             : April 29, 2008
INVENTOR(S)       : Tuss It is certified that error appears in the above-identified patent and that said Letters Patent is hereby corrected as shown below:

In column 8, line 23, delete "expense-of" and insert -- expense of --, therefor.

Signed and Sealed this

Seventh Day of October, 2008

JON W. DUDAS
*Director of the United States Patent and Trademark Office*